Sept. 13, 1966  R. W. DROSMAN  3,272,398
COFFEE DISPENSER
Filed Oct. 15, 1964  3 Sheets-Sheet 1
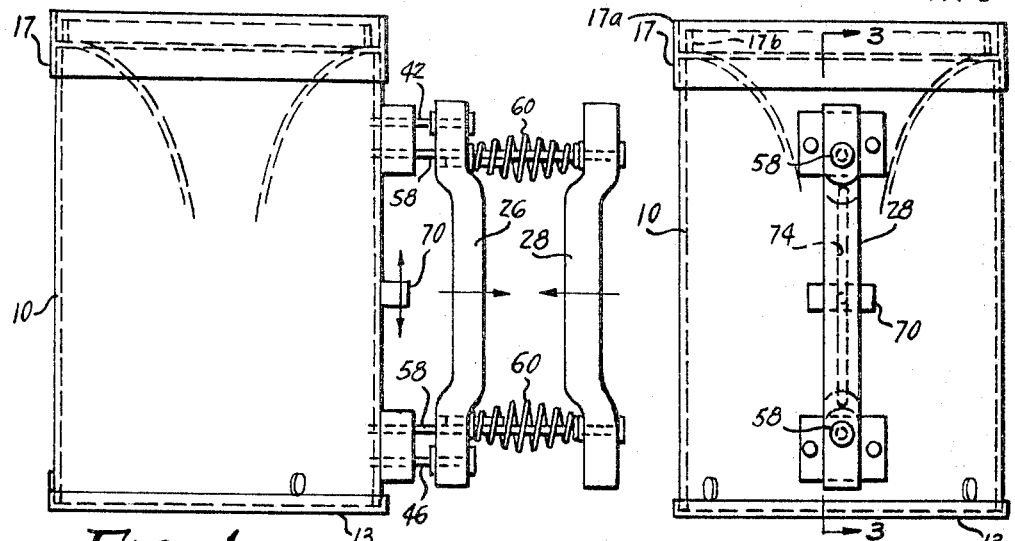
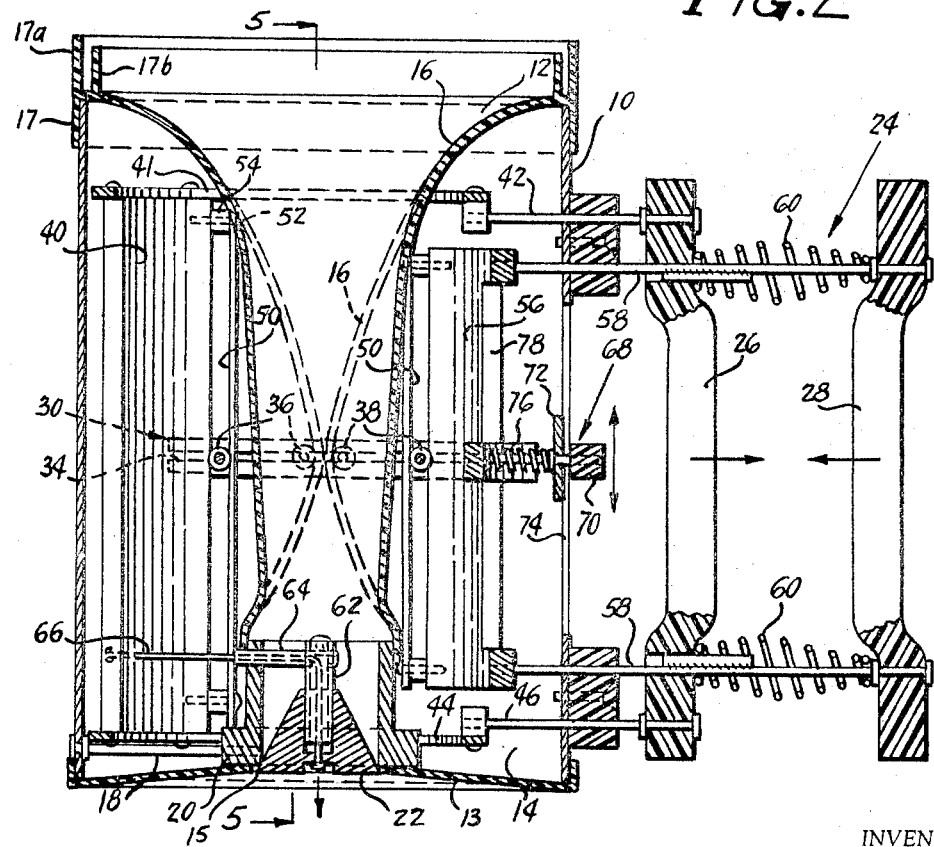
INVENTOR.
RICHARD W. DROSMAN
BY
Kimmel & Crowell
ATTORNEYS.

Sept. 13, 1966  R. W. DROSMAN  3,272,398
COFFEE DISPENSER

Filed Oct. 15, 1964  3 Sheets-Sheet 2

INVENTOR.
RICHARD W. DROSMAN
BY
Kimmel & Crowell
ATTORNEYS.

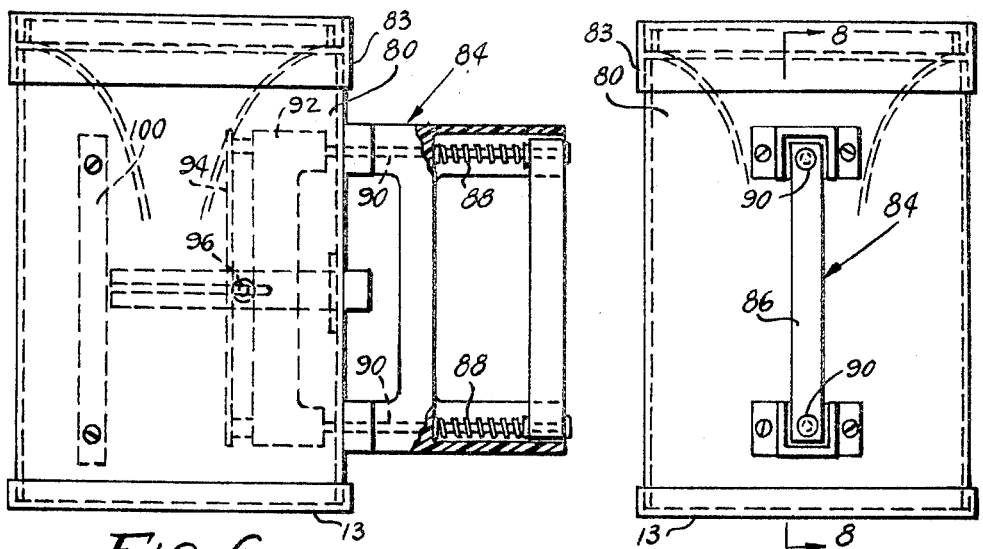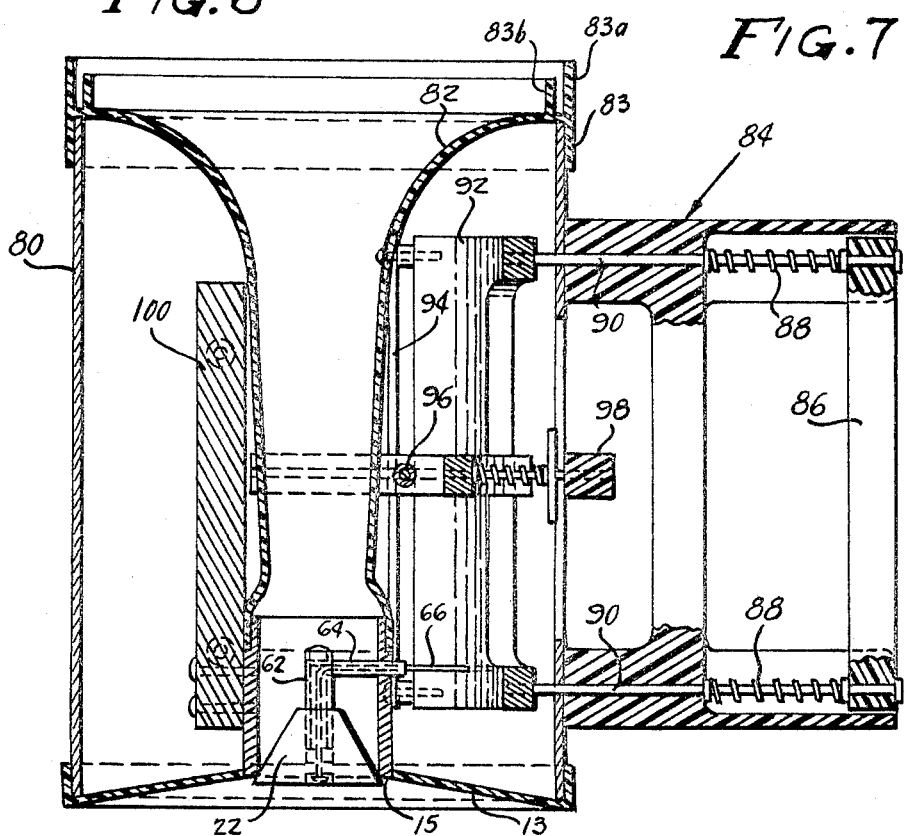

United States Patent Office 3,272,398
Patented Sept. 13, 1966

3,272,398
COFFEE DISPENSER
Richard W. Drosman, 234 N. 11th, Corvallis, Oreg.
Filed Oct. 15, 1964, Ser. No. 403,994
5 Claims. (Cl. 222—210)

The present invention relates to a device for dispensing powdered or granulated coffee or other loose material which should be precisely measured when dispensed.

An object of the present invention is to provide a hand-held dispenser for coffee or the like which is accurate in the amount of coffee dispensed, one which is simple in structure, one sturdy in construction, and one economical to manufacture and assemble, wherein the top is provided with an attachment to hold a coffee can or other container of material.

Another object of the present invention is to provide a dispenser for loose material, such as powdered coffee or the like which enables the user thereof to dispense an accurate amount of material time after time, one which may be manufactured in such sizes to accommodate lesser or greater amounts of material, and one which is highly effective in action.

Figure 4:
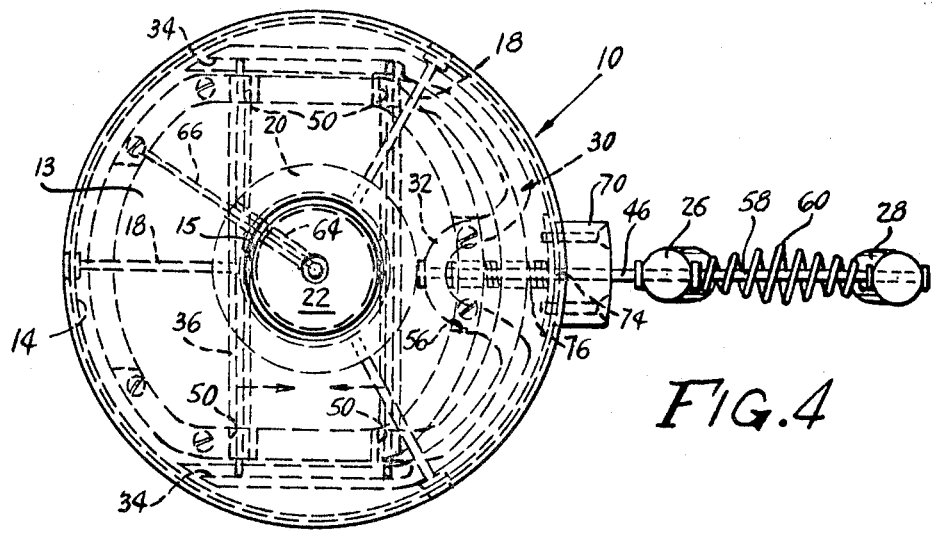
Figure 5:
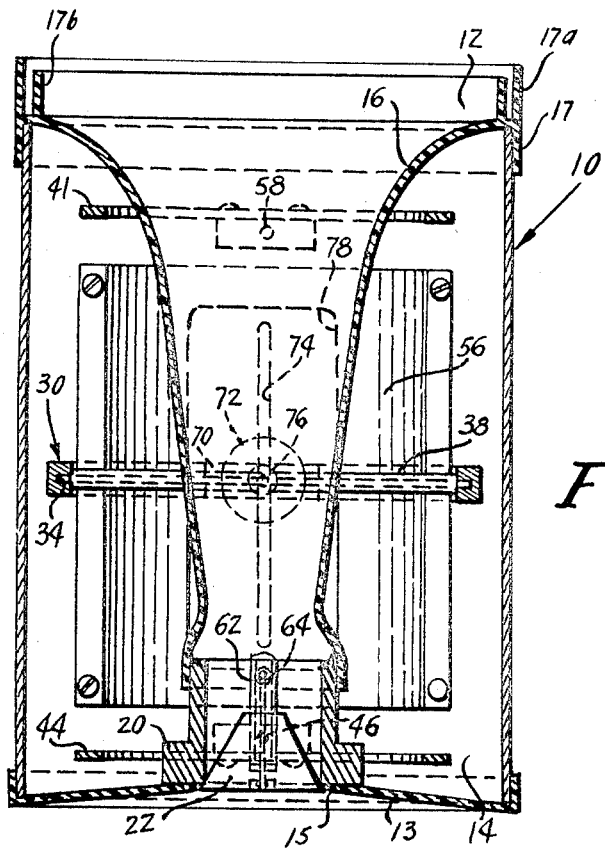

These and other objects and advantages of the present invention will be fully apparent from the following description when taken in connection with the annexed drawings, in which:

FIGURE 1 is an elevational view of the dispenser, according to a first embodiment, FIGURE 2 is another elevational view taken at 90° from the view shown in FIGURE 1, FIGURE 3 is the view in section on an enlarged scale, taken on line 3—3 of FIGURE 2, FIGURE 4 is a bottom plan view, FIGURE 5 is a view taken on the line 5—5 of FIGURE 3, FIGURE 6 is an elevational view of the second embodiment of the invention, FIGURE 7 is an elevational view taken at 90° to the view shown in FIGURE 6, and FIGURE 8 is a view on an enlarged scale taken on the line 8—8 of FIGURE 7.

Referring to the drawings in detail and in particular to FIGURES 1 to 5, inclusive, in which like numerals have like parts throughout the several views, the coffee dispenser of the present invention comprises an upright cylindrical body 10 having an open top 12 and a bottom 14. A plate 13 with a central opening 15 closes the bottom.

An upright resilient funnel-shaped liner 16 has at its upper end an overlapping flange 17 surrounding the upper end of the body 10 and attached thereto as shown most clearly in FIGURE 3. Flange 17 has an upright portion 17a, and an inner concentric flange 17b spaced therefrom the two flanges forming a support for the lower rim of a coffee can or the like.

Three rods 18, arranged radially as shown in FIGURE 4, support at their inner ends an upright tube 20 having its upper end open and its lower end open. A plug 22 is mounted in the tube 20 for upward movement and downward movement through opening 15, the limit of its upward movement closing the lower end of the tube 20, as shown in FIGURE 5.

A handle assembly 24 projects outwardly from one side of the body 10 and includes two grip members 26 and 28 movable toward and away from each other as indicated by the arrows in FIGURE 3.

The lower end of the liner 16 is cemented to the upper end of the tube 20 and means is provided associated with the grip members 26 and 28 for pinching off or squeezing the liner 16 together to close the upper end of the space between the plug 22 and the upper end portion of the liner 16 so as to deliver out of the tube 20 when the plug 22 is in the open position the material measured by the space between the plug and the closing means associated with the grip means or members 26 and 28.

A horizontally disposed U-shaped member 30 having its bight 32 bent inwardly as shown in FIGURE 4, is secured to the body 10 midway of the length of the body 10 and has grooves 34 provided in each of its legs as shown in dotted lines in FIGURE 4. Seated in the grooves 34 are the free end portions of the rollers 36 and 38 which serve to compress the sides of the liner 16 when they are moved together.

The roller 36 is connected to the grip member 26 and the roller 38 is connected to the grip member 28 for movement toward each other responsive to movement of the grip members 26 and 28 toward each other.

The roller 36 is supported on the mid-portion on an upright semi-cylindrical support member 40 which has its upper end connected by a yoke 41 and a rod 42 to the inner grip member 26 as shown most clearly in FIGURE 3. The lower end of the support member 40 is connected by a second yoke 44 and a rod 46 to the lower end of the grip member 26.

The rod or roller 36 is held between the free ends of the support member 40 and a pair of bars 50 spaced from the ends of the support member 40 as shown in FIGURE 3, the bars 50 being spaced outwardly by means of rivets 52 and spacing elements 54, as shown most clearly with respect to the upper end of the member 40 in FIGURE 3.

Another semi-cylindrical support member 56 similarly supports or controls the action of the roller 38, the support member 56 being carried by rods 58 which have the outer ends mounted in the grip member 28. A support bushing 62 is positioned centrally of the tube 20 and is supported on one end of a hollow tubing element 64 which projects through the wall of the tube 20. A flexible cable 66 has one end anchored in the support member 40 and has its other end fixed to plug 22 with the mid portion traveling through the bushing 62 and the tubing element 64.

Upon movement of the support member 40 towards the position in which the roller closes the space within the throat of the liner 16, the cable 66 pushes through the element 64 and bushing 62 downwardly so that the plug 22 is moved from the closing position to the opening position with respect to the lower end of the tube 20.

A feature of the invention resides in the fact that the member 30 is supported upon the body 10 by means of a sliding assembly 68 having a handle 70 exteriorly of the body 10. A washer 72 engages the inner wall of the body 10 adjacent and bridging a slot 74. A spring 76 is interposed between the washer 72 and the member 30 and biases the washer 72 into frictional engagement with the wall of the body 10. The handle 70 may be moved by the thumb of the user so that the rollers 36 and 38 may be moved upwardly and downwardly so as to change the space between the plug 22 and the rollers 36 and 38.

The member 30 is slidable upwardly and downwardly through the opening 78 provided in the support member 56, the opening being shown in dotted lines in FIGURE 5.

Referring to FIGURES 6 through 8, inclusive, a modified form of the invention is shown in which there is a single support member and a single rod moving toward the liner in response to the squeezing movement on a grip member carried by the handle assembly.

In this form of the invention the body is designated by the numeral 80 and the liner by the reference 82. The liner 82 is provided with flanges 83, 83a and 83b corresponding to and performing the same function as flanges 17, 17a and 17b. The handle is designated generally by the numeral 84 and the grip member 86 is slidable in the handle 84 and is biased outwardly by means of springs 88. Rods 90 extend through the handle 84 and have on their ends within the body 80 a support member 92 having a bar 94 spaced therefrom and serving as a guide for the one roller 96.

The roller 96 is shiftable upwardly and downwardly responsive to upward and downward movement of handle 98 positioned exteriorly of the body 80, the handle 98 and the associated mechanism supporting the roller 96 being similar to that supporting the roller 38 in the first embodiment illustrated and described.

The rest of the second embodiment is substantially identical to that previously described and carries identical reference characters with the exception of the addition of an upright bar 100 which serves as a stop for the roller 96 and serves to hold the adjacent portion of the liner 82 when the roller 96 is moved to the liner closing position.

While only a preferred form of the invention is shown and described, it is contemplated that other embodiments may be made and practiced within the spirit of the invention as set forth in the appending claims.

What is claimed is:

1. A dispenser for coffee or the like comprising, an upright cylindrical body having an open top and a bottom with an opening therein, an upright resilient funnel-shape liner having its upper end merging with the upper end of said body and having the lower end thereof within and spaced upwardly from said body bottom, a vertically disposed dispensing tube within said body adjacent the lower end thereof, said tube having the upper end connecting in communication with the lower end of said liner, a vertically movable plug normally closing the lower end of said tube, a handle projecting outwardly from said body, said handle including a grip member movable toward and away from said body, horizontally disposed roller means disposed within said body and spaced between said body and said liner and mounted in said body for movement into and out of squeezing engagement with the adjacent portion of the liner, and means connecting said roller means and said plug to said handle grip member actuable upon movement of said grip member toward said body to shift said roller into squeezing engagement with said liner and simultaneously move said plug to tube opening position.

2. A dispenser for coffee or the like comprising, an upright cylindrical body having an open top and a bottom with an opening therein, an upright resilient funnel-shape liner having its upper end merging with the upper end of said body and having the lower end thereof within and spaced upwardly from said body bottom, a vertically disposed dispensing tube within said body adjacent the lower end thereof, said tube having the upper end connecting in communication with the lower end of said liner, a vertically movable plug normally closing the lower end of said tube, a handle projecting outwardly from said body, said handle including a pair of grip members movable toward and away from each other, a pair of horizontally disposed parallel spaced rollers disposed within said body and spaced between said body and said liner and mounted in said body for movement into and out of squeezing engagement with the adjacent portion of said liner, and means connecting said rollers to said grip members actuable upon execution of movement of said grip members together to shift said rollers into squeezing engagement with said liner.

3. The apparatus according to claim 1 together with spring means biasing said handle grip member to the away position.

4. The apparatus according to claim 2 together with spring means biasing said handle grip members to the position away from each other.

5. The apparatus according to claim 3, together with means connecting said rollers to said body for movement toward and away from said dispensing tube.

References Cited by the Examiner

UNITED STATES PATENTS

| | | | |
|---|---|---|---|
| 1,550,686 | 8/1925 | Garvey | 222—470 X |
| 2,726,019 | 12/1955 | Moran | 222—445 |
| 2,963,258 | 12/1960 | Stambera | 222—214 X |

LOUIS J. DEMBO, *Primary Examiner.*

CHARLES R. CARTER, *Assistant Examiner.*